US009277758B2

(12) United States Patent
Zeller et al.

(10) Patent No.: US 9,277,758 B2
(45) Date of Patent: Mar. 8, 2016

(54) LIQUID COFFEE BEVERAGE CONCENTRATE

(75) Inventors: Bary Lyn Zeller, Glenview, IL (US); John B. Topinka, Evanston, IL (US); Dale Anthony Kyser, Vernon Hills, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 293 days.

(21) Appl. No.: 13/417,029

(22) Filed: Mar. 9, 2012

(65) Prior Publication Data

US 2013/0064956 A1    Mar. 14, 2013

Related U.S. Application Data

(60) Provisional application No. 61/532,991, filed on Sep. 9, 2011.

(51) Int. Cl.

| | |
|---|---|
| *A23F 3/18* | (2006.01) |
| *A23F 5/26* | (2006.01) |
| *A23F 5/28* | (2006.01) |
| *A23F 3/16* | (2006.01) |
| *A23F 3/22* | (2006.01) |
| *A23F 5/24* | (2006.01) |

(52) U.S. Cl.
CPC . *A23F 3/18* (2013.01); *A23F 3/163* (2013.01); *A23F 3/225* (2013.01); *A23F 5/243* (2013.01); *A23F 5/26* (2013.01); *A23F 5/262* (2013.01); *A23F 5/28* (2013.01)

(58) Field of Classification Search
CPC ........... A23L 2/00; A23L 2/382; A23L 2/385; A23F 3/00; A23F 3/16; A23F 3/163; A23F 3/18; A23F 3/225; A23F 5/00; A23F 5/24; A23F 5/243; A23F 5/26; A23F 5/28; A23F 5/285; A23V 2250/21; A23V 2250/214; A23V 2250/2108; A23V 2250/2116
USPC ................. 426/594, 590, 597, 598, 518, 425
See application file for complete search history.

(56) References Cited

U.S. PATENT DOCUMENTS

| | | | |
|---|---|---|---|
| 2,340,758 A * | 2/1944 | Kappenberg et al. ......... 426/432 | |
| 2,929,150 A | 3/1960 | Johnston | |
| 3,962,321 A * | 6/1976 | Parliment et al. ............ 426/535 | |
| 4,748,033 A | 5/1988 | Syfert | |
| 4,981,699 A | 1/1991 | Inada | |
| 5,013,447 A | 5/1991 | Lee et al. | |
| 5,690,984 A | 11/1997 | Lim | |
| 5,705,205 A | 1/1998 | Brunerie | |
| 5,747,081 A | 5/1998 | Lee et al. | |
| 5,792,502 A | 8/1998 | Montezinos | |
| 5,919,511 A | 7/1999 | Hagiwara | |
| 5,928,703 A | 7/1999 | Chmiel et al. | |
| 6,242,030 B1 | 6/2001 | O'Reilly | |
| 6,544,576 B2 * | 4/2003 | Zeller et al. .................. 426/594 |
| 6,669,963 B1 | 12/2003 | Kampinga | |
| 6,835,405 B2 | 12/2004 | Merkt et al. | |
| 7,553,509 B2 | 6/2009 | Dorr et al. | |
| 2001/0043976 A1 | 11/2001 | O'Reilly | |
| 2002/0178605 A1* | 12/2002 | Aoki ............................... 34/92 |
| 2004/0086619 A1 | 5/2004 | Zhong | |
| 2006/0204633 A1 | 9/2006 | Moore | |
| 2007/0009641 A1 | 1/2007 | Erickson | |
| 2008/0020115 A1 | 1/2008 | Guerrero et al. | |
| 2008/0085349 A1 | 4/2008 | Chen | |
| 2008/0226776 A1 | 9/2008 | Roy et al. | |
| 2008/0280023 A1 | 11/2008 | Kalenian | |
| 2009/0047405 A1 | 2/2009 | Zhang | |
| 2009/0232941 A1 | 9/2009 | Farmer | |
| 2010/0233322 A1 | 9/2010 | Fukuda et al. | |
| 2011/0059205 A1 | 3/2011 | Gaysinsky et al. | |
| 2011/0123700 A1 | 5/2011 | Peththawadu | |

FOREIGN PATENT DOCUMENTS

| | | | |
|---|---|---|---|
| CA | 1130988 A1 | | 9/1982 |
| CN | 88101423 A | | 10/1988 |
| EP | 0 010 665 A1 | | 5/1980 |
| GB | 2022394 | * | 12/1979 |
| GB | 2347606 | * | 9/2000 |
| GB | 2378693 | * | 2/2003 |
| GB | 2410172 A | | 7/2005 |
| JP | S61187747 A | | 8/1986 |
| JP | H07-067532 A | | 3/1995 |
| WO | 2004054379 A1 | | 7/2004 |
| WO | 2013036287 A2 | | 3/2013 |

OTHER PUBLICATIONS

International Search Report for PCT/US2012/028579 mailed Aug. 20, 2013.
Chinese Office Action, Chinese Patent Application No. 201280054870.6, dated Apr. 17, 2015, 31 pages.
Japanese Office Action, Japanese Patent Application No. 2014-529706, mailed Aug. 18, 2015, 7 pages.

* cited by examiner

*Primary Examiner* — Anthony Weier
(74) *Attorney, Agent, or Firm* — Fitch, Even, Tabin & Flannery LLP

(57) ABSTRACT

Liquid brewed beverage concentrates and methods of making the concentrates are provided herein. The concentrates are liquid and flowable at room temperature and can be diluted in an aqueous liquid to provide a beverage having the general appearance, flavor, and aroma of a freshly brewed beverage. The concentrates include a low water content, high non-aqueous liquid content, particularly non-volatile non-aqueous liquid content, and high flavor solids content, the amounts of which are balanced to provide concentrates with a desired flavor profile with little or no flavor degradation after storage at room temperature in a sealed container for at least about three months.

24 Claims, No Drawings

LIQUID COFFEE BEVERAGE CONCENTRATE

CROSS-REFERENCE TO RELATED APPLICATION

This application claims the benefit of U.S. Provisional Application No. 61/532,991, filed Sep. 9, 2011, which is hereby incorporated herein by reference in its entirety.

FIELD

The disclosure relates to shelf stable liquid beverage concentrates, and particularly to shelf stable, brewed beverage concentrates suitable for dilution with a potable liquid for preparing coffee and/or tea beverages.

BACKGROUND

Commercially-available coffee concentrates are typically manufactured by partially dehydrating aqueous extracts of solid flavor sources. Alternatively, such products are manufactured by dissolving the dried extracts in water. These products are commonly subjected to thermal processing and/or fortification with chemical preservatives to improve microbiological stability and increase shelf life.

Liquid aqueous coffee concentrates have been commercially available for decades, but these products still suffer from widely-known shortcomings related to their composition and handling requirements. For example, initial flavor quality may be greatly inferior to freshly-brewed coffee and shelf life at room temperature may be very short, requiring refrigerated or frozen distribution and storage. It is also known that these types of products are often chemically unstable, as generally evidenced by increasing acidity and sedimentation, and decreasing flavor quality, during storage. Aqueous liquid tea concentrates are also known, and these products are similarly prone to flavor degradation and sedimentation during storage.

Attempts have been made to improve the chemical stability of aqueous coffee concentrates, but the methods generally require use of expensive or complicated processing, chemical treatments, or chemical preservatives. Freezing may reduce or prevent some instability problems but at a cost of increased energy consumption and inconvenience because frozen products must be thawed before use. Under some conditions, freezing may also increase reactions or sedimentation because solutions undergo freeze-concentration into a progressively smaller volume of liquid, thereby increasing the potential for solute interactions. Freezing and frozen storage typically require the use of temperatures well below the freezing point of pure water to effectively solidify such freeze-concentrated solutions, further increasing costs and time required for processing and thawing.

SUMMARY

Liquid brewed beverage concentrates and methods of making the concentrates are provided herein. The concentrates are liquid at room temperature and can be diluted in an aqueous liquid to provide a beverage having the general appearance, flavor, and aroma of a freshly brewed beverage. The brewed beverage concentrates can be added to hot, cold, or room temperature beverages, depending on the preference of the consumer.

The concentrates include a low water content, high non-aqueous liquid ("NAL") content, and high botanical flavor solids content, the amounts of which are balanced to provide concentrates with a desired flavor profile with little or no flavor degradation after storage at room temperature in a sealed container, such as for at least about three months, in another aspect at least about six months, and in another aspect at least about 8 months. The flavor solids may be included in the concentrate in a variety of ways, including dissolving, dispersing, and/or suspending the flavor solids in the concentrate. In some approaches, the flavor solids are coffee or tea solids.

The beverage concentrates provided herein can be prepared from one or more solid flavor sources. Suitable solid flavor sources include, for example, any brewed or brewable botanical beverage base, such as, but not limited to, beans, seeds, leaves, roots, flowers, twigs, stalks, barks, pods, buds, peels, and needles. Beverage bases may be brewed, or otherwise utilized, in any raw, dried, roasted, or fermented form, in whole or comminuted state, according to various methods disclosed herein. Specific examples include coffee beans, tea (green, black, red, or white) leaves or twigs, cinnamon bark, ginger root, clove buds, cardamom pods, rosemary needles, orange peels, hibiscus, chamomile, or rose flowers, lemongrass stalks, cocoa nibs, yerba mate, chicory, and combinations thereof. Suitable solid flavor sources also specifically include freeze-dried coffee, spray-dried coffee, spray-dried tea, ground roast coffee, instant coffee powder, instant tea powder, ground coffee beans, botanical extract, and combinations thereof, and combinations thereof.

It is believed that the absence or scarcity of water in the beverage concentrates described herein beneficially prevents, or at least substantially reduces, the occurrence of such reactions and transformations (often caused by dissociated acids, including acids naturally present in coffee or tea solids) to improve product quality and increase shelf life. Also, it is believed that the much higher viscosity of NALs, relative to water, likely greatly slows such reactions and transformations, even if small amounts of water are present in the beverage concentrates. Further, acids, such as may be extracted from coffee or other flavor sources, do not readily dissociate in NALs to release their hydrogen ions, which may cause or catalyze chemical reactions or further lower the pH of the flavor solids.

Methods for preparing extracts of botanical solid flavor sources, as well as methods for preparing liquid brewed beverage concentrates containing the botanical solid flavor sources are also provided.

DETAILED DESCRIPTION

Liquid brewed beverage concentrates and methods of making the concentrates are provided herein. The concentrates are liquid and flowable at room temperature and can be diluted in an aqueous liquid to provide a beverage having the general appearance, flavor, and aroma of a freshly brewed beverage. In some approaches, the concentrates described herein advantageously allow for the convenient production of beverages that mimic freshly brewed coffee or tea beverages. The liquid brewed beverage concentrates described herein provide great convenience to consumers desiring a way to prepare coffee and tea beverages without the need for coffee brewing equipment and without the need to thaw frozen concentrates. The brewed beverage concentrates can be added to hot, cold, or room temperature beverages, depending on the preference of the consumer.

The concentrates include a low water content, high non-aqueous liquid ("NAL") content, and high botanical flavor solids content, the amounts of which are balanced to provide concentrates with a desired flavor profile with little or no flavor degradation after storage at room temperature in a sealed container, such as for at least about three months, in another aspect at least about six months, and in another aspect at least about 8 months. The flavor solids may be included in the concentrate in a variety of ways, including dissolving, dispersing, and/or suspending the flavor solids in the concentrate. In some approaches, the flavor solids are coffee or tea solids. Advantageously, the concentrates described herein can be produced without the need for sterilization or preservatives, as well as without the need for refrigerated or frozen distribution and storage, while being more chemically stable at room temperature than an otherwise identical brewed beverage concentrate that includes water instead of non-aqueous liquid. As such, the concentrates described herein are formulated and prepared using the ingredients in the ratios and amounts described herein to provide very desirable flavor quality and longer shelf life compared to an aqueous beverage concentrate having the same amount of flavor solids but with water instead of NAL.

As used herein, the term "concentrate" means a liquid composition that can be diluted with an aqueous, potable liquid to provide a beverage or added to a food product prior to being consumed. The phrase "liquid" refers to a non-gaseous, flowable, fluid composition at room temperature (i.e., about 20° to about 25° C.). The term "brewed" means that the concentrate contains chemical constituents extracted from a solid flavor source that are soluble and/or dispersible in the concentrate, and which collectively comprise flavor and/or aroma characteristic of the flavor source. In many instances, the solid flavor source is a coffee and/or tea flavor source. The term "low water" as used herein to describe the beverage concentrates means the weight of NAL included in the concentrate is the same as or exceeds the weight of water present in the concentrate. With respect to this definition, the NAL weight includes the weight of any non-volatile NAL ("NV-NAL") and/or volatile NAL ("V-NAL") used to formulate the concentrate, plus any NAL present in optional other ingredients, such as liquid flavors, used to formulate the concentrate. In one aspect, the beverage concentrates may contain up to about 30 percent water, in another aspect less than about 25 percent water, in another aspect less than about 20 percent water, in another aspect less than about 15 percent water, in another aspect less than about 10 percent water, and in yet another aspect less than about 5 percent water by weight of the concentrate so long as the amount of water does not exceed the amount of NAL in the concentrate. In some aspects, the amount of NAL in the low water concentrate exceeds the amount of water in the concentrate by at least about 5 percent, in another aspect at least about 10 percent, in another aspect at least about 15 percent, and in yet another aspect at least about 20 percent.

By some approaches, the beverage concentrates are substantially non-aqueous or substantially free of water, which as used herein mean that the concentrate includes less than about 5 percent, in another aspect less than about 2 percent, in another aspect less than about 1 percent water, and in yet another aspect less than about 0.5 percent water by weight of the concentrate, including both residual and added water. As such, this term is also used to describe concentrates that are devoid of water. In some approaches, a beverage concentrate is provided having a water activity in the range of less than about 0.8, in another aspect less than about 0.5, in another aspect less than about 0.3, and in another aspect less than about 0.1.

In general, the use of decreasing water levels results in increased protection against unwanted chemical reactions to improve flavor stability and decrease the rate of sedimentation, thereby greatly improving the shelf life of the concentrates. Increasing NAL content also generally results in increased viscosity of the concentrate. Use of increasing amounts of water in beverage concentrates generally will disproportionately increase water activity and decrease viscosity. Therefore, the relative amounts of NAL and water, if any, included in the concentrates described herein can be selected to provide desired product attributes and shelf life.

In some approaches, the beverage concentrates are formulated and manufactured without intentional use of water. In some approaches, dry or dried NALs and substantially anhydrous forms of solid flavor sources and optional other ingredients may be used. Ingredients used to formulate the concentrate may optionally be first subjected to drying to remove or reduce their moisture content. At least in some approaches, the presence of water in any form should be minimized to the extent practical, and, at least in some approaches, is entirely avoided during formulation of the concentrates.

Without wishing to be limited by theory, it is presently believed that water, which typically is the major component of currently available aqueous coffee and tea concentrates, causes or enables the chemical reactions that cause flavor degradation and sedimentation during storage. For example, it is known that lactones present in aqueous coffee concentrates are hydrolyzed by water, which results in lowering pH and increasing sourness. Also, mannan polymers present in such products are known to crystallize and precipitate in water. Further, many labile flavors are known to react, either with water or in water, to produce compounds having decreased flavor impact or off-flavor. Tannins present in aqueous tea concentrates may precipitate during storage, especially if hard water is used to formulate the products.

It is believed that the absence or scarcity of water in the beverage concentrates described herein beneficially prevents, or at least substantially reduces, the occurrence of such reactions and transformations (often caused by dissociated acids, including acids naturally present in coffee or tea solids) to improve product quality and increase shelf life. Also, it is believed that the much higher viscosity of NALs, relative to water, likely greatly slows such reactions and transformations, even if small amounts of water are present in the beverage concentrates. Further, acids, such as may be extracted from coffee or other flavor sources, do not readily dissociate in NALs to release their hydrogen ions, which may cause or catalyze chemical reactions or further lower the pH of the flavor solids.

Food acids typically have lower acid dissociation constants ($K_a$) in organic liquids, such as NALs, than in water. The concentrates described herein take advantage of this phenomenon to advantageously reduce the effective acidity of liquid beverage concentrate products containing acids. The $K_a$ value for a particular acid may, for example, be several orders of magnitude, or more, lower, in a particular NAL than in water. Without being limited by theory, it is believed lowered acid $K_a$ and free-proton concentration in acid-containing beverage concentrate products greatly slow, or prevent, unwanted chemical reactions to beneficially improve flavor component stability and thereby improve product quality and increase shelf life.

Even though acids may dissolve in NAL, it is believed that protons in acidic carboxyl groups only weakly dissociate, relative to their dissociation in water, or dissociate while remaining in close proximity to carboxyl anions, to beneficially lower free proton concentration and potential to cause or promote chemical reactions. Further, the scarcity or absence of water in the described concentrates reduces the formation of highly reactive strongly-acidic hydronium ions present in much higher concentration in acid-containing aqueous solutions.

Because any acids present in the beverage concentrates will be less dissociated than in aqueous concentrates, the products may be formulated to include acid sensitive ingredients without adverse effect, or with diminished adverse effect, compared to their use in aqueous concentrates. For example, coffee beverage concentrates can be formulated with certain acid-sensitive flavors, sweeteners, or milk powders to provide flavored, sweetened, or milky prepared beverages that could not otherwise be produced from aqueous concentrates to provide acceptable flavor, appearance, or shelf life.

The beverage concentrates provided herein can be prepared from one or more solid flavor sources that contain chemical constituents that are soluble and/or dispersible in the concentrate, and which collectively comprise flavor and/or aroma characteristic of the flavor source. Suitable solid flavor sources include, for example, any brewed or brewable botanical beverage base, such as, but not limited to, beans, seeds, leaves, roots, flowers, twigs, stalks, barks, pods, buds, peels, and needles. Beverage bases may be brewed, or otherwise utilized, in any raw, dried, roasted, or fermented form, in whole or comminuted state, according to various methods disclosed herein. Specific examples include coffee beans, tea (green, black, red, or white) leaves or twigs, cinnamon bark, ginger root, clove buds, cardamom pods, rosemary needles, orange peels, hibiscus, chamomile, or rose flowers, lemongrass stalks, cocoa nibs, yerba mate, chicory, and combinations thereof. Suitable solid flavor sources also specifically include freeze-dried coffee, spray-dried coffee, spray-dried tea, roast coffee, instant coffee powder, instant tea powder, roast coffee beans, botanical extract, and combinations thereof.

NALs utilized in the compositions described herein may be either protic or aprotic NALs. As used herein, protic NALs possess one or more hydroxyl groups having an ionizable hydrogen atom while aprotic NALs do not. Individual protic or aprotic NALs may be either volatile or non-volatile. In general, food acids dissolved in aprotic NALs will dissociate to a lesser extent than the same acids dissolved in protic NALs, and acids dissolved in NAL mixtures will dissociate to intermediate extents in general proportion to the compositions and levels of NALs present. NALs can be selected to advantageously control the extent of acid dissociation and pH of the beverage concentrates created using solid flavor sources which naturally include acids and/or added acids.

Suitable V-NALs that can be used herein include, but are not limited to, ethanol, ethyl acetate, benzyl alcohol, propanol, or mixtures thereof. Supercritical fluids, such as supercritical carbon dioxide, may also be utilized. As used herein, V-NALs are liquids that have a boiling point less than water (i.e., at about 100° C. at ambient atmospheric pressure). NV-NALs that can be used include, but are not limited to, glycerol, propylene glycol, 1,3-propanediol, polyethylene glycols, polyglycerols, polyglycerol esters, triacetin, vegetable oil, or combinations thereof. As used herein, NV-NALs are liquids that either do not boil or have a boiling point greater than water at ambient atmospheric pressure. Of NV-NALs that boil, it may be desirable to use those having a high enough boiling point to limit the evaporation of the NAL from a prepared hot beverage to reduce the likelihood of adversely impacting the perceived beverage quality. For example, inclusion of NV-NAL having a boiling point of higher than about 150° C., in another aspect higher than about 200° C., and in another aspect higher than about 300° C., may be desirable.

At least in some aspects, use of NALs having relatively bland flavor and aroma may be desirable to limit any potential adverse effect on the organoleptic quality of beverages prepared with the concentrates. Protic NV-NALs that are particularly suited because of their generally bland flavor and compatibility with foods include, for example, glycerol, propylene glycol, and 1,3-propanediol. Aprotic NV-NALs that may be utilized for generally the same reasons include, for example, triacetin and vegetable oils, such as coffee oil or medium-chain triglyceride oils.

In some approaches, the concentrates include about 30 to about 90 percent NAL, in another aspect about 40 to about 80 percent NAL, and in another aspect about 50 to about 70 percent NAL by weight of the concentrate. In some approaches, the amount of NV-NAL included in the concentrates is the same as that described for NAL above, whereby the concentrate includes about 30 to about 90 percent NV-NAL, in another aspect about 40 to about 80 percent NV-NAL, and in another aspect about 50 to about 70 percent NV-NAL by weight of the concentrate. In some aspects, the beverage concentrates do not contain any added water or V-NAL. In some instances, it may be impossible or impractical to remove such liquids from a solid flavor source or extract thereof, so in some aspects, the beverage concentrate contains less than about 30 percent, in another aspect less than about 20 percent, in another aspect less than about 10 percent, in another aspect less than about 5 percent, in another aspect less than about 2 percent, and in another aspect less than about 1 percent combined weight of any water and V-NAL included in the concentrate. However, the total amount, by weight, of water and/or V-NAL in the beverage concentrates is less than or equal to the amount, by weight, of NV-NAL and less than or equal to the total mass of solids included in the concentrate, including solids extracted or otherwise provided from the solid flavor source and any additional ingredients.

In some approaches, it may also be desirable to reduce or eliminate the amount of V-NAL, particularly any V-NAL having inherent flavor or odor that may not be desired in prepared beverages, in the beverage concentrates. Doing so generally beneficially increases the flash point of the concentrate and beneficially decreases the potential for V-NAL to adversely impact flavor and aroma of prepared beverages. In one aspect, the concentrate includes less than about 20 percent V-NAL, in another aspect less than about 15 percent V-NAL, in another aspect less than about 10 percent V-NAL, in another aspect less than about 5 percent V-NAL, in another aspect less than about 1 percent V-NAL, and in yet another aspect 0 percent V-NAL.

Some physical properties of NALs are provided in Table 1 below. It can be seen that, in general, NV-NALs typically have much higher viscosity, density, and boiling point than water or ethanol (V-NAL). Accordingly, beverage concentrates prepared from non-volatile NALs typically have much higher viscosity, higher density, and lower volatility than corresponding concentrates made from the same solid flavor sources at the same levels, but where water or ethanol are utilized instead of non-volatile NAL. In some cases, high NAL viscosity can limit the amount of flavor source that can be dissolved, dispersed, or dispensed, but higher viscosity may be a benefit in some product applications and may be controlled by selection of NAL used, either alone or in combination, to formulate the concentrates, or by use of some water and/or ethanol in combination with NAL to lower viscosity.

TABLE 1

Approximate Physical Properties of Liquids at Room Temperature

| Liquid | Viscosity (cP) | Density (g/cc) | Boiling Point (° C.) |
|---|---|---|---|
| Water | 1 | 1.00 | 100 |
| Ethanol | 1 | 0.79 | 78 |
| 1,3-Propanediol | 52 | 1.06 | 214 |
| Propylene Glycol | 56 | 1.04 | 178 |
| Glycerol | 1200 | 1.26 | 290 |
| Triacetin | 25 | 1.16 | 258 |

In general, viscosity of the concentrates increases with increasing amounts of solids dissolved and/or dispersed therein, and with increasing NAL viscosity. Further, viscosity of the concentrates and of the NAL generally decreases with increasing temperature. This property beneficially increases flowability to allow generally higher solids levels to be utilized in concentrates manufactured using heating while also beneficially providing relatively higher viscosity at lower storage and usage temperatures, such as room temperature, to make concentrates less susceptible to spilling or splashing during handling. Advantageously, the concentrates described herein are fluids under conditions of manufacture, storage, and use. Further, the concentrates are not regarded as being gels because they have no, or insignificant, yield stress and no, or insignificant, elasticity.

Further, without wishing to be limited by theory, it is presently believed that higher concentrate viscosity beneficially lowers potential for component interactions via slowing of molecular diffusion and chemical reactions to better preserve initial flavor quality and/or increase concentrate shelf-life. The viscosity of the concentrates described herein can be measured using established methods, such as using a Brookfield or other viscometer, but need not be routinely analyzed because other properties, such as composition, flavor, and storage stability have greater practical significance, and suitable viscosity is easily recognized from bulk flow characteristics. In some approaches, the viscosity of the concentrates described herein may be about as high as, or higher than, many vegetable and light mineral oils (i.e., 50-100 cP), and in another aspect may be about as high as or higher than heavy motor oils (i.e., 200-400 cP) as measured at room temperature. In other approaches, viscosity can be as high as, or higher than, honey (i.e., 2,000-10,000 cP) or molasses (i.e., 5,000-10,000 cP), especially for concentrates formulated using relatively high levels of glycerol and/or flavor source. In some applications, viscosity may beneficially be increased up to about that of molten chocolate or ketchup (i.e., 50,000-100,000 cP), or higher. There are no upper limits on viscosity other than providing ability to pour, scoop, squeeze, squirt, or otherwise dispense the liquid concentrates from packages. At least in some approaches, the viscosity of the concentrates described herein is generally higher than the viscosity of concentrates comprising the same dissolved or dispersed solids, and solids levels, that are formulated with water instead of NAL.

By some approaches, a brewed extract of a solid flavor source can be prepared for use in the concentrates herein. The method includes brewing or otherwise extracting the solid flavor source using a liquid to provide an extract of the solid flavor source containing chemical constituents present in the flavor source which collectively comprise flavor and/or aroma characteristic of the flavor source. The term "brewing" is intended to mean steeping, mixing, or otherwise effectively contacting the solid flavor source in the liquid so as to extract at least a portion (in one aspect at least about 5 percent, in another aspect at least about 10 percent, in another aspect at least about 30 percent, in another aspect at least about 40 percent, and in yet another aspect at least about 50) of those chemical constituents present in the flavor source that are soluble and/or dispersible in the liquid, and which collectively comprise flavor and/or aroma characteristic of the flavor source.

The method of brewing the solid flavor source is not particularly limited and any suitable method and operating pressure, with or without heating, using water, NAL, or combinations thereof can be used. In one aspect, the botanical solid flavor source is brewed in a liquid comprising a non-volatile non-aqueous liquid for a time and at a temperature effective to extract chemical constituents that are soluble and/or dispersable in the non-aqueous liquid from the solid flavor source, where the chemical constituents collectively comprise flavor and/or aroma characteristic of the flavor source. The non-volatile non-aqueous liquid containing the extracted chemical constituents are then separated from the remainder of the solid flavor source, which can be considered a spent solid flavor source, to provide a brewed, non-aqueous botanical extract. By one approach, the extract can be separated from the remainder of the solid flavor source by filtration.

By one approach, if the flavor source is brewed with water or a volatile NAL (V-NAL) to provide a flavor source extract containing chemical constituents that collectively comprise flavor and/or aroma characteristic of the flavor source, the extract prepared from the flavor source may be partially or completely dehydrated or concentrated using any suitable method such as, but not limited to, evaporation, distillation, membrane filtration, spray-drying, freeze-concentration or freeze-drying, before or after combining the extract with NAL to prepare a brewed liquid beverage concentrate as described herein. In some aspects, the extract is combined with a NV-NAL to provide a brewed liquid beverage concentrate as described herein.

In some approaches, the solid flavor source can be extracted with water and the resulting aqueous extract concentrated and/or dried, before or after combining the extract with a NAL. In some aspects, the NAL added to the extract is a NV-NAL. In another form, the flavor source can be extracted with one or more V-NAL, NV-NAL, or any mixture thereof. Any V-NAL used in the extraction may be partially or completely removed from the extract, such as by evaporation, distillation, filtration, or drying.

In yet another aspect, vapors produced during removal of water and/or V-NAL from extracts, or by contacting the flavor source with NV-NAL, may be collected, such as by low-temperature condensation, and subjected to any separation, fractionation, or purification process effective to recover volatile compounds derived from the flavor source for addition to beverage concentrates to modify or improve perceived quality of flavor and/or aroma. Optionally, volatile compounds derived from the flavor source may be directly condensed into one or more NV-NAL to provide a source of flavor and/or aroma for use in the beverage concentrates described herein.

Concentrates having low water content and high non-aqueous liquid content can be provided in a variety of forms and can be prepared by a variety of processes. Concentrates in the form of emulsions, solutions (i.e., in which the ingredients are dissolved in NAL or aqueous liquid included in the concentrate), and suspensions can be prepared by the methods described below. The concentrates described herein can include both water-soluble and water-insoluble ingredients, as well as ingredients that are soluble and insoluble in the selected NAL. Other methods of preparing the liquid concentrates having low water content as described herein can also be used, if desired. The following methods are intended to be exemplary but not limiting in scope.

In some approaches, the concentrate can be prepared by combining a solid flavor source with non-aqueous liquid. The total weight of dissolved, dispersed, and/or suspended matter extracted or obtained from the solid flavor sources characterizing the beverage concentrate and from optional other ingredients included in the concentrate (i.e., total solids content) are included in an amount of about 10 percent to about 70 percent, in another aspect about 25 to about 60 percent, in another aspect about 35 percent to about 55 percent, and in yet another aspect about 40 to about 50 percent by weight of the concentrate. The total solids content includes all components of the beverage concentrate except NAL and water.

The solid flavor source may be dissolved, dispersed, or suspended in the non-aqueous liquid. At least in some approaches, the total weight of water-soluble matter extracted from the solid flavor sources characterizing the beverage concentrates, and any water-soluble optional other ingredients utilized, exceeds the total weight of any water-insoluble dispersed and/or suspended matter in the concentrates, whether or not the there is any water present in the concentrates. Water-insoluble and/or suspended matter in the concentrates may include, but is not limited to, coffee oil, vegetable oil, or ground roasted coffee, tea, cocoa, or spice particles. In one aspect, the total weight of soluble solids extracted from the solid flavor source in the beverage concentrate is more than two times, and in another aspect more than three times, the total weight of optional other ingredients (e.g., sweetener, color, etc.) and/or suspended particulate present in the concentrates. In other words, the most prevalent solid component of the concentrate is the matter extracted from the brewed solid flavor source, such as, for example, a concentrate may comprise instant coffee at a higher level than any added sweetener or suspended coffee solids. To limit suspended solids (i.e., particulate solids) content in the concentrate, the total weight of the suspended solids in the concentrate is about 0 to about 20 percent, in another aspect about 2 percent to about 15 percent, and in yet another aspect about 5 percent to about 10 percent by weight of the concentrate.

Beverage concentrates comprising an insoluble solids component in the form of a suspended particulate component (e.g., insoluble particles from a solid flavor source or other additive) dispersed in a NAL can be manufactured by grinding or other suitable method of size reduction. By some approaches, the mean particle size of the insoluble solids component in these dispersions is less than about 50 microns, in another aspect less than 10 microns, in another aspect less than 1.0 micron, and in another aspect less than 0.1 micron. The particle size of the insoluble solids component can be reduced by grinding, milling, or any other suitable size reduction method, including, for example, solidifying previously dissolved solids to a desired particle size, before, during, or after addition to the concentrate. Grinding may be accomplished, at least to some extent, by subjecting the solid flavor source to blending, high-shear mixing, homogenization, sonication, or cavitation. The precise conditions used during particle size reduction are not believed to be critical and suitable conditions could readily be determined by one of ordinary skill in the art to provide desired appearance and viscosity, as well as to control the sedimentation rate of solids suspended in the non-aqueous liquid during storage. Particle size reduction, using any suitable method, generally improves the uniformity of the concentrate, which also generally improves the appearance, texture, fluidity, and flowability of the concentrate. Generally, the smaller the particle size, the longer the particles will stay suspended without precipitating. While not wishing to be limited by theory, it is presently believed that reduction of the mean particle size is effective to prolong suspension of the solids component in the non-aqueous liquid sufficient to delay or prevent the precipitation of solid particles during manufacture and storage. In some approaches, a particle size reduction technique can be used to provide a particle size that does not impart a gritty mouthfeel to beverages prepared from the concentrates. Suspensions of solids in liquids are generally known as sols and those having particle size less than about 0.1 micron are generally known as colloidal sols.

For example, a particulate flavor source in the form of roasted coffee particles or tea leaves particles may be added to a beverage concentrate to improve flavor, aroma, appearance, texture, or strength of the concentrate and/or beverages prepared from the concentrate. By some approaches, the beverage concentrate containing the coffee or tea particles also comprises a water-extracted and subsequently dried, or partially dried, coffee or tea extract that has been dissolved or suspended in one or more NAL. After addition of the coffee particles or tea leaves, the concentrate may be subjected to homogenization or other method to further improve flowability, reduce viscosity, or slow particle sedimentation.

In some aspects, the beverage concentrates are provided in the form of saturated solutions, and in other aspects supersaturated solutions. The solids of the saturated or supersaturated solutions include solids obtained by extracting the solid flavor source and/or solids in the form of optional other ingredients. Concentrates in the form of saturated or supersaturated solutions provide increased flavor strength and reduced volume to allow use at lower levels when combined with water to prepare beverages, as well as increased viscosity and elimination or reduction of the amount of free water, if any, or other liquids present to beneficially prevent or slow any unwanted chemical reactions or sedimentation.

By another approach, a beverage concentrate can be prepared by a method comprising: providing a solids component comprising a solid flavor source in non-aqueous liquid, the solids component being provided in an amount that exceeds its solubility in the non-aqueous liquid at a temperature below the melting or softening point of the solids component; heating the solids component to above the melting or softening point to dissolve the melted solids component in the non-aqueous liquid; cooling the non-aqueous liquid containing the dissolved solids under conditions effective to slow or prevent solidification of the melted solids (e.g., for at least about 24 hours, in another aspect at least about one week, and in another aspect at least about one month) to provide the liquid beverage concentrate. Use of a melting or softening point depends on the type of solid flavor source included in the concentrate. For example, instant coffee and tea powers have a softening point while other types of ingredients, like sugars, have a melting point. Conditions effective to slow or prevent solidification include, but are not limited to, use of non-aqueous liquids, which decrease molecular mobility as a result of their viscosity being greater than water, to prepare beverage concentrates, slowly cooling after heating the solids component, use of mixtures of solids, and/or use of crystallization inhibitors.

By another approach, a beverage concentrate can be prepared by a method comprising providing a solids component comprising a solid flavor source in non-aqueous liquid, the solids component being provided in an amount that exceeds its solubility in the non-aqueous liquid at a temperature below the melting or softening point of the solids component; heating the solids component to above the melting or softening point to dissolve the melted solids component in the non-aqueous liquid; and cooling the non-aqueous liquid containing the dissolved solids under conditions effective to form suspended solid particles in the non-aqueous liquid to provide the flavored liquid beverage concentrate.

In both of the above-described approaches involving the melting and/or softening of the solids component, the solids component is included in super saturated amounts in the non-aqueous liquid (i.e., the solids component is included at a concentrate that exceeds its solubility therein at any temperature below their solid melting or softening point). When the solids component includes at least two different ingredients, the solids component is melted at a temperature high enough to melt the ingredient having the highest melting or softening point. The solids component in the non-aqueous liquid is then melted and/or softened by heating to completely dissolve the solids in the non-aqueous liquid to provide a super-saturated melt. The solids are considered to be completely dissolved upon visual inspection.

Extracted flavor components and optional additional ingredients present in melts or suspensions may exist simultaneously in one or more of a dissolved, dispersed, or suspended state in the concentrates. Optional dispersant or crystallization inhibiting ingredients may be added to the NAL before, during, or after any dissolving, heating, or grinding conducted in manufacture. Such substance may be utilized to prevent, reduce, or slow solid nucleation or crystallization, or to limit the size of any crystals or particles formed during concentrate manufacture or storage.

If needed or desired, one or more dispersants or crystallization inhibitors may optionally be added to beverage concentrates to prevent, reduce, or slow nucleation, flocculation, or precipitation of dissolved or suspended components during manufacture or storage. Concentrates may optionally comprise liquid-in-liquid type emulsions and a suitable emulsifier can be added to such products to prevent, reduce, or slow separation of the liquids into discrete layers as may result from the liquids having different densities. For example, coffee oil can be emulsified into a beverage concentrate comprising glycerol, or other NAL, and extracted roasted coffee solids, or other solid flavor source, to create a liquid-in-liquid emulsion.

During manufacture of the beverage concentrates described herein, the rate of extraction or dissolution of any component from the solid flavor source may be increased by optionally heating the NAL to a temperature between ambient room temperature and its boiling point (if it has one) before or during extraction or dissolution. It may also be desirable in some approaches to heat the solid flavor source to its softening point to increase its rate of extraction or dissolution. In some aspects, heated mixtures of extracted flavor components dissolved or suspended in NALs are first cooled to room temperature prior to addition of any heat sensitive ingredients, such as flavors and/or aromas, to the mixtures to minimize undesirable chemical reactions and flavor changes.

In some approaches, the concentrates may further include additional optional ingredients, such as but not limited to ingredients not extracted from the botanical solid flavor source. Such ingredients may be solids or liquids and may include, but are not limited to, natural or artificial flavors, sweeteners, buffers or other salts, vitamins, nutrients, surfactants, emulsifiers, stimulants, antioxidants, preservatives, crystallization inhibitors, natural or artificial colors, or combinations thereof. Ingredients that may optionally be used to impart creaminess or whitening may include liquid, but are not limited to, liquid or powdered dairy or non-dairy creamers, any milk concentrate, powder or protein, milk substitutes, such as soy concentrates, powders, or proteins, or combinations thereof. Any of the additional ingredients included may be subjected to heating, grinding, softening or melting, or subsequently added to prepared solutions, suspensions, or cooled melts to minimize the volume of material processed in manufacturing and to minimize the potential for unwanted reactions. In some aspects, the additional ingredients may also be added to NAL before or after heating, in any manner effective to limit their own degradation or potential reaction with extracted flavor components, as may be readily determined by one skilled in the art of food processing.

Sourcing NAL from Solid Flavor Source

A variety of non-aqueous liquids can be obtained from food ingredient suppliers. Glycerol and propylene glycol are widely available and usually manufactured via chemical synthesis, although glycerol is also available as a byproduct of biodiesel manufacture or soap-making from vegetable oils or animal fats. 1,3-propanediol can be obtained from a joint-venture of DuPont and Tate & Lyle that manufactures this liquid by fermenting food-sourced sugars. Propylene glycol obtained via fermentation processes may also be obtained from suppliers. In some aspects, the non-aqueous liquids will have been subjected to filtration, distillation, or other purification step effective to remove most or all foreign components or impurities prior to use in the concentrates and methods described herein.

The non-aqueous liquids used herein may alternatively be sourced from coffee, or other food sources, in applications where such sourcing is beneficial with regard to food product labeling, standard of identity, cost, flavor, or quality. For example, glycerol may be sourced from coffee oil, which is a byproduct of instant coffee manufacturing, using any known method of recovering glycerol from vegetable oils, such as hydrolysis, saponification, or transesterification. In addition, glycerol, propylene glycol, 1,3-propanediol, or other pure or mixed polyol may be sourced from coffee cherries, coffee beans, spent coffee grounds, coffee oil, or other source using any known methods of obtaining polyols from biomass. Such materials can be used in either raw or purified form, depending on particular concentrate product applications and relevant quality targets or regulatory requirements.

In some approaches, it may be advantageous to source the NAL from the solid flavor source, or other food source, to avoid the need to add or declare foreign ingredients or the need to utilize ingredients derived from petroleum or other non-food source. For example, it may be possible to obtain glycerol by hydrolyzing or saponifying oil extracted from coffee beans, or to produce ethanol, glycerol, propylene glycol, 1,3-propanediol, or triacetin from suitable coffee sources, such as cherries, beans, or spent grounds obtained as a byproduct of soluble coffee manufacturing. Any suitable microbial fermentation, enzyme treatment, or chemical reaction may be utilized to obtain or produce any desired NAL, in a raw or purified form, for use in the beverage concentrates.

Accordingly, the methods described herein can be applied to beneficially manufacture beverage concentrates that, in one form, do not contain any foreign ingredients. For example, a coffee concentrate can be produced comprising only brewed roasted coffee and glycerol obtained from coffee oil. Such a concentrate may optionally contain natural coffee aroma and/or suspended roasted coffee particles, and can be manufactured with or without water.

The beverage concentrates described herein are microbiologically stable due to absence or scarcity of water and will not support growth of bacteria, yeast, or mold commonly found in foods and manufacturing facilities when stored at room temperature or lower in a sealed container, even without the need to exclude all water or moisture from the components utilized in their manufacture. At least in some approaches, the concentrates will remain microbiologically stable during their shelf life even if exposed to higher temperatures commonly encountered in unrefrigerated food distribution and storage.

In some approaches, the concentrates described herein may be stored at room temperature (i.e., about 20° C. to about 25° C.) and remain shelf stable for at least about three months, in another aspect at least six months, in another aspect at least nine months, and in yet another aspect at least twelve months. By "shelf stable" it is meant that the concentrate avoids substantial flavor degradation and is microbially stable such that the concentrate has an aerobic plate count (APC) of less than about 5000 CFU/g, yeast and mold at a level less than about 500 CFU/g, and coliforms at 0 MPN/g when stored at room temperature in a sealed container. The shelf-stable concentrate can be diluted with a potable liquid to provide a beverage that has substantially the same, or otherwise acceptable, flavor quality and appearance as a beverage prepared from a freshly prepared or frozen concentrate (i.e., within 24 hours of preparation). In some aspects, the concentrates may even retain acceptable flavor quality and appearance for two years or longer. Such judgments can generally be made by a trained panel or consumer preference testing.

However, in some applications, long shelf life may not be needed and presence of a relatively small amount of residual or added water may be effective to beneficially lower the viscosity of beverage concentrates or improve their dispersion in water during reconstitution without adversely affecting flavor quality and appearance. In some approaches, use of relatively small amounts of water could enable formulation of beverage concentrates that have increased levels of dissolved solids with acceptable viscosity.

Although the concentrates described herein do not require refrigerated or frozen storage, such treatment can be used to further increase their shelf life, and the products can be formulated to remain fluid in freezers so that they do not require thawing before use.

Further, at least in some approaches where keeping water content at minimal levels is desired, the concentrates may be protected against contact with water or water vapor to the greatest practical extent during manufacture and storage. At least in some approaches, the concentrates have a water content as close as possible to 0 percent by weight after manufacture and are prepared with solid flavor sources and optional other ingredients without any significant amount of moisture or water of crystallization.

The concentrates described herein can be added to a variety of food or beverage products prior to consumption. By one approach, the concentrate can be added to a liquid, such as for example water or milk to provide a tea or coffee flavored beverage. The concentrates may be combined with hot liquids or foods, but can also be combined with cold liquids or foods to prepare beverages or flavored foods. The concentrates described herein can be combined with a variety of food products to add flavor to the food products. For example, the concentrates described herein can be used to provide flavor to a variety of solid, semi-solid, and liquid food products. Appropriate ratios of the beverage concentrate to food product or beverage can readily be determined by one of ordinary skill in the art.

To prepare aqueous beverages for consumption, the concentrates can be combined with water or other potable liquid at a weight ratio of water to concentrate of about 10:1 to about 300:1, in another aspect about 20:1 to about 200:1, and in yet another aspect about 30:1 to about 100:1. More particularly, at least in some approaches where the concentrate contains a coffee-based solid flavor source, the concentrates can be combined with water or other potable liquid at a weight ratio of water to concentrate of about 10:1 to about 100:1, in another aspect about 20:1 to about 80:1, and in yet another aspect about 30:1 to about 60:1. At least in some approaches where the concentrate contains a tea-based solid flavor source, the concentrates can be combined with water or other potable liquid at a weight ratio of water to concentrate of about 20:1 to about 300:1, in another aspect about 40:1 to about 200:1, and in yet another aspect about 60:1 to about 100:1. Coffee beverages are typically consumed with a solids content of about 0.6 to about 1.5 percent by weight of the beverage, while tea beverages are typically consumed with a solids content of about 0.1 to about 0.5 percent by weight of the beverage.

Depending on the beverage concentrate composition and viscosity, as well as the temperature of the potable liquid, stirring may or may not be required to disperse the concentrate in water. By some approaches, the dilution factor of the concentrate to provide the finished beverage may depend, at least in part, on the flavor intensity, solids content, and/or viscosity of the concentrate. The dilution factor of the concentrate can also be expressed as the amount necessary to provide a single serving of concentrate.

Packaging and Dispensing

The concentrates may be packaged and dispensed in any manner, such as from a bottle or other multi-serve container, from a single-serve pod or capsule, from a bulk package such as a bag-in-box container, or from a vending machine. Pre-measured bags or envelopes appropriately sized for addition to standard hot-water urns or other foodservice devices may be produced to improve user convenience and better control over beverage strength. Two or more packaged concentrates may be dispensed together, in any suitable manner, to prepare a single beverage or other food product.

Further, for example, a foodservice operator could prepare a coffee concentrate using a soluble coffee powder, glycerol, and a small amount of water to provide a convenient microbiologically-stable fluid form of coffee that can be easily dispensed from a container or vending machine over the course of a dining event, a weekend event, or a week-long event without producing substantial loss of flavor quality or sedimentation during that time.

Advantages and embodiments of the concentrate compositions described herein are further illustrated by the following examples; however, the particular conditions, processing schemes, materials, and amounts thereof recited in these examples, as well as other conditions and details, should not be construed to unduly limit the compositions and methods described herein. All percentages in this application are by weight unless otherwise indicated.

Spray-dried or freeze-dried soluble coffee powders used in the examples below were produced using conventional instant coffee manufacturing processes and were obtained by extracting ground roast coffee particles with hot water and then drying. The term "soluble" in this regard refers to these powders being soluble in water.

EXAMPLES

Example 1

Concentrates Containing Spray-Dried Soluble Coffee Powder

A non-aqueous fluid coffee concentrate composition "A" (100%/wt) was prepared by spoon-stirring a spray-dried soluble coffee powder (Robusta; 33%/wt), into NAL (propylene glycol; 67%/wt). The mixture was then heated in a microwave oven at full power for a total of one minute to a temperature of 180° F. while removing and spoon-stirring the mixture every 10 seconds effective to dissolve or disperse all the coffee into the NAL.

A comparative non-aqueous coffee concentrate composition "B" (100%/wt) was prepared by spoon-stirring the same spray-dried soluble coffee powder (Robusta; 33%/wt) into distilled water (67%/wt). The mixture was then heated in a microwave oven at full power to a temperature of 180° F., then spoon-stirred for one minute to dissolve all the coffee solids in the water.

Both coffee concentrates were stored for 30 days at 37° C. in capped glass 20 mL vials under an air headspace. The concentrates were removed from storage and separately added to hot (210° F.) tap water at a level of 3 parts, by weight, concentrate to 97 parts, by weight, water to prepare hot coffee beverages which were evaluated to assess quality. It was apparent, even to untrained panelists, the beverage prepared from concentrate "A" had a very desirable clean coffee flavor and aroma. By comparison, the beverage prepared from concentrate "B" had an off-aroma, described as fruity and pruny. The beverage prepared from concentrate "A" was not tasted, since the concentrate was found to be microbiologically unstable. Microscopic examination revealed bacteria and yeast grew in concentrate "B" during storage.

Example 2

Concentrates Containing Spray-Dried Soluble Coffee Powder

A non-aqueous fluid coffee concentrate "A" (100%/wt) was prepared by spoon-stirring a spray-dried soluble coffee powder (Robusta; 33%/wt) into NAL (propylene glycol; 67%/wt). The mixture was then heated in a microwave oven to a temperature of 200° F. and held for 10 minutes at that temperature while spoon-stirring to dissolve or disperse all the coffee into the NAL.

A comparative non-aqueous fluid coffee concentrate "B" (100%/wt) was prepared by spoon-stirring the spray-dried soluble coffee powder (Robusta; 33%/wt) into NAL (1,3-propanediol 67%/wt). The mixture was then heated in a microwave oven to a temperature of 200° F. and held for 10 minutes at that temperature while spoon-stirring to dissolve or disperse all the coffee into the NAL.

Both coffee concentrates were stored for 10 days at 37° C. in capped glass 20 mL vials under an air headspace. The products were removed from storage and separately added to hot (210° F.) tap water at a level of 3 parts by weight concentrate to 97 parts by weight water to prepare hot coffee beverages.

Example 3

Concentrates Containing Spray-Dried Soluble Coffee Powder

A fluid non-aqueous coffee concentrate "A" (100%/wt) was prepared by hand-stirring a spray-dried soluble coffee powder (Robusta; 33%/wt), into NAL (caprylic/capric triglyceride, NEOBEE M-5® from Stepan Co., Northfield, Ill.; 67%/wt) at room temperature, then subjecting the mixture to high-shear mixing using a rotor-stator type mixer (Heidolph: Silent Crusher-M at 50,000 rpm) to grind and disperse the coffee into a smooth and homogenous suspension.

A fluid coffee concentrate "B" (100%/wt) was prepared by spoon-stirring the spray-dried soluble coffee powder (Robusta; 33%/wt) into distilled water (67%/wt) at room temperature. The mixture was then mixed using a rotor-stator type mixer (Heidolph: Silent Crusher-M at 50,000 rpm) to grind and dissolve all the coffee solids into a smooth homogenous solution.

Both concentrates were stored for 30 days at 37° C. in capped glass 20 mL vials under an air headspace. The products were removed from storage and separately added to hot (210° F.) tap water at a level of 3 parts, by weight, concentrate to 97 parts, by weight, water to prepare coffee beverages which were evaluated to assess quality. It was apparent, even to untrained panelists, the beverage made with concentrate "A" had a clean coffee flavor and aroma. By comparison, the beverage made with concentrate "B" had an off-odor, described as fruity and pruny. The beverage made with concentrate "B" was not tasted, since the concentrate was found to be microbiologically unstable. Microscopic examination revealed bacteria and yeast grew in concentrate "B" during storage. In order to deliver a more-homogenous and emulsified coffee beverage from concentrate "A," a suitable surfactant and possibly an oil weighting agent could also be included during mixing.

Example 4

Whitened Coffee

Non-aqueous fluid coffee concentrate composition "A" (100%/wt) was prepared by spoon-stirring spray-dried soluble coffee powder (Robusta; 20%/wt) and spray-dried coffee creamer powder (20%/wt; Gordon Foods Service, primary ingredients: corn syrup solids, partially hydrogenated soybean oil, sodium caseinate) into NAL (propylene glycol; 60%/wt) in a beaker and then high-shear mixing using a rotor-stator mixer (Heidolph Silent Crusher-M at 50,000 rpm) to grind and disperse the coffee and creamer powders into NAL to obtain a smooth and homogenous suspension.

Non-aqueous fluid coffee concentrate composition "B" (100%/wt) was prepared by spoon-stirring spray-dried soluble coffee powder (Robusta; 20%/wt) into propylene glycol (80%/wt) in a beaker and then high-shear mixing using a rotor-stator mixer (Heidolph Silent Crusher-M at 50,000 rpm) to grind and disperse the coffee powder into NAL to obtain a smooth and homogenous suspension.

Concentrates A and B were separately added to hot (210° F.) tap water in beakers at a level of 5 parts by weight concentrate to 95 parts by weight hot water to prepare coffee beverages which were evaluated to assess turbidly and color. It was very apparent, even to untrained panelists, the beverage prepared using concentrate "A" had much more turbid appearance and much lighter color than the beverage prepared using concentrate "B," which was clear and had visibly darker color. Both beverages had acceptable flavor.

Example 5

Concentrate Containing Milled Coffee

A non-aqueous fluid coffee concentrate composition (100%/wt) was prepared by spoon-stirring ground roast coffee (Yuban Dark Roast; 20%/wt) into NAL (propylene glycol; 80%/wt) in a plastic pail, then mixing using a Model 7S1515 Lightnin mixer with marine-prop style blade until the coffee particles were uniformly distributed in NAL, and then milling using a Buhler K8 (FKK-040-M) colloid mill with 1.5 mm glass beads (350 g/minute flow rate; 0.2 psi back-pressure; and 1400 rpm speed) to provide a viscous opaque, dark-brown sol of very small roast coffee particles (having a maximum particle size of less than 50 microns, and predominantly less than 10 microns) suspended in NAL.

The milled product was added to hot (210° F.) tap water in a beaker at a level of 5 parts by weight concentrate to 95 parts by weight water and spoon-stirred to prepare a coffee beverage which was evaluated to assess turbidly and flavor. The beverage had a more turbid appearance than a traditional coffee beverage prepared by brewing ground roast coffee or by dissolving instant coffee powder in water but was found to have a pleasant coffee flavor and aroma of the type generally characterizing brewed fresh ground roast coffee. Although the milled product was used alone to prepare a coffee beverage in this example, it may also be used, typically at a lower level than in this example, as an optional source of coffee particulates in beverage concentrates, especially those prepared using a relatively greater amount (versus amount of milled product) of soluble coffee powder, effective to enhance coffee flavor and aroma of beverages prepared by adding concentrates to hot water.

Example 6

Liquid Coffee Concentrates (pH Stability in Presence of Water)

A series of fluid coffee concentrates (100%/wt) was prepared by combining instant Maxwell House coffee (33.3%/wt) with NAL (propylene glycol (PG) or glycerol; 66.7%/wt), water (66.7%/wt), or mixture (66.7%/wt) of NAL and water. For each mixture of NAL and water, the total of liquid in the compositions was 67%, but the amount of each was varied within the liquid fraction of the concentrates to provide NAL-to-water ratios of 3:1 (75%/25%), 1:3 (25%/75%), or 1:1 (50%/50%). Each composition was then separately heated in a glass beaker to either 195° F. or 150° F. in a microwave oven at full power, followed by a 10 minute hold time, and then placed in an ice water bath to rapidly cool to about room temperature.

All concentrates were then stored for six weeks at 25° C. in multiple capped glass vials under an air headspace. To evaluate the pH of prepared beverages, concentrates were added to hot (210° F.) tap water at a level of 3 parts by weight concentrate to 97 parts by weight water and the resulting coffee beverages then stirred with a spoon. After cooling to about 150° F., prepared beverage pH was measured using a pH electrode and meter that automatically corrected for temperature to provide equivalent room temperature pH data, which is summarized in Table 2 below. Initial pH data for prepared beverages made from non-aqueous concentrates having NAL-to-water ratio of 100%/0% immediately after preparing the concentrates (i.e., prior to storage) are also provided in the table for reference. Initial pH of beverages prepared from concentrates having other NAL-to-water ratios was not measured before storage because the very small amounts of NAL (at most 2 parts NAL per 100 parts of beverage) present in all the prepared coffee beverages do not significantly affect pH.

TABLE 2

Effect of Water on pH Stability of Stored Coffee Concentrates

| Liquid Fraction of Concentrates | | | NAL Used to Prepare Concentrates | | | | |
|---|---|---|---|---|---|---|---|
| | | | PG | PG | Glycerol | Glycerol | |
| | | | Concentrate Heating Temperature | | | | |
| % NAL | % Water | % Total | 150° F. | 195° F. | 150° F. | 195° F. | Comments |
| | | | pH of Prepared Beverages (Six Weeks) | | | | |
| 0 | 100 | 100 | 4.55 | 4.64 | 4.68 | 4.67 | Least Preferred |
| 25 | 75 | 100 | 4.61 | 4.69 | 4.74 | 4.71 | |
| 50 | 50 | 100 | 4.66 | 4.71 | 4.79 | 4.77 | Less Preferred |
| 75 | 25 | 100 | 4.74 | 4.81 | 4.84 | 4.84 | More Preferred |
| 100 | 0 | 100 | 4.84 | 4.88 | 4.87 | 4.88 | Most Preferred |
| | | | Initial pH of Prepared Beverages | | | | |
| 100 | 0 | 100 | 4.87 | 4.87 | 4.91 | 4.91 | Most Preferred |

It can be seen that prepared beverage pH progressively decreased during storage with increased proportion of water in the liquid fraction. It was also observed that, as the proportion of water in the liquid fraction progressively increased, the prepared beverage turbidity progressively increased, which, while not wishing to be bound by theory, is presently believed to be due to formation of water-insoluble crystalline mannose during storage. This demonstrates advantages of formulating fluid coffee concentrates using liquid fractions having a low amount of water or no water. It can be seen from the initial pH data that pH of beverages prepared form concentrates made with no added water (100% NAL) did not significantly change after storing the concentrates for six weeks. Although only the six-week pH data are included in the table, identical vials, among the stored multiple vials, of concentrates were removed from storage every two weeks (2, 4, and 6 weeks) for beverage preparation and pH measurement. Results showed the pH of beverages prepared from concentrates made with no added water did not significantly change between removal times, while pH of beverages prepared from concentrates made with added water clearly demonstrated progressive decreases in pH with increasing storage times. Accordingly, beverages prepared from concentrates made with water had lower pH at the end of every two week storage period.

Example 7

Milled Tea (Green, Red, or Hibiscus)

Three different non-aqueous fluid tea concentrate compositions (100%/wt) were prepared by separately spoon-stirring three solid flavor sources consisting of finely dry-milled dried botanicals (broken green tea leaves, red tea leaf needles, or hibiscus flowers obtained, before grinding, from a local spice retailer; each 15%/wt) into NAL (propylene glycol; 85%/wt) in separate beakers and then separately mixing using a rotor-stator mixer (Heidolph Silent Crusher-M at 50,000 rpm) to create fine dispersions of these solid botanicals in NAL.

The resulting fluid tea concentrates were separately added to hot (210° F.) tap water at a level of 10 parts by weight concentrate to 90 parts by weight water and then spoon-stirred to prepare tea beverages that were evaluated to assess flavor quality. Each prepared beverage provided excellent flavor and appearance characteristic of its source. The green tea beverage was described, by an untrained panel, as having a pleasant, slightly-grassy, green tea flavor and color; the red tea beverage as having a pleasant, sweet, aromatic flavor characteristic and color of red tea; and the hibiscus tea beverage as having a pleasant, light floral note with slight astringency and pink color characteristic of hibiscus.

Example 8

NAL-Extracted Coffee (Used alone or to Enhance Flavor of Instant Coffee Dispersed in NAL)

A non-aqueous fluid coffee concentrate composition (100%/wt) was prepared by combining a solid flavor source (whole Brazilian Arabica coffee beans; 33%/wt) with NAL (propylene glycol; 67%/wt) in a plastic pail. This mixture was then poured into a blender jar (Waring® Laboratory) and mixed at high speed for two minutes to grind the beans. The resulting suspension of ground beans in NAL was then poured into a glass flask and slowly heated on a laboratory hotplate (Corning Stirrer Hot Plate) while hand stirring with a glass rod until reaching 200° F. During the mixing step and subsequent heating step, soluble coffee components were extracted from the solid coffee flavor source into NAL. The heated mixture was then left to stand for 10 minutes before filtering it into a glass flask through a paper filter disc (Whatman #4) placed in a Buchner funnel.

The resulting fluid coffee concentrate was collected from the flask and added to hot (210° F.) tap water in a beaker at a level of 5 parts by weight concentrate to 95 parts by weight water and then spoon-stirred to prepare a coffee beverage that was evaluated to assess flavor and appearance. The beverage had a slightly turbid, dark-brown appearance similar to traditionally-brewed ground roast coffee beverages and was found to have a strong roast coffee flavor and aroma possessing many key fresh groundsy notes characteristic of brewed roast coffee.

Example 9

Use of Both Coffee Concentrate Made with Instant Coffee and NAL-Extracted Concentrate A non-aqueous fluid coffee concentrate composition (100%/wt) was prepared by combining a solid flavor source (freeze-dried Carte Noire coffee; 30%/wt) with NAL mixture (35%/wt each of propylene glycol and 1,3-propanediol) in a glass beaker and then high-shear mixing using a rotor-stator mixer (Heidolph Silent Crusher-M at 50,000 rpm) to grind and disperse the coffee into the NAL mixture to obtain a smooth and homogenous suspension. The resulting fluid coffee concentrate was added to hot (210° F.) tap water in a beaker at a ratio of 3 parts by weight concentrate to 96 parts by weight water and 1 parts by weight of the filtered coffee concentrate of Example 8 and then spoon-stirred to prepare a coffee beverage that was evaluated to assess flavor and appearance. The beverage had the general appearance of a prepared instant coffee beverage but had a pleasant coffee flavor and aroma of the type generally characterizing brewed fresh ground roast coffee. This example demonstrates the ability to beneficially substantially enhance flavor and aroma of a beverage prepared from a fluid instant coffee concentrate by addition of a fluid NAL-extracted coffee concentrate to impart fresh groundsy notes not normally provided by instant coffee powders.

Example 10

NAL-Milled Coffee (Used to Enhance Flavor of Instant Coffee Dispersed in NAL)

A non-aqueous fluid coffee concentrate composition (100%/wt) was prepared by combining the non-aqueous fluid coffee concentrate compositions of Example 5 (15%/wt) and Example 9 (85%/wt) in a beaker and spoon-stirring to obtain a uniform mixture. This concentrate mixture was then added to hot (210° F.) tap water in a glass beaker at a level of 4 parts by weight mixture to 96 parts by weight water and then spoon-stirred to prepare a coffee beverage that was evaluated to assess flavor and appearance. The beverage had a slightly-turbid, dark-brown appearance that was somewhat similar to a brewed ground roast coffee beverage and had a pleasant roast coffee flavor and aroma possessing many key fresh groundsy notes characteristic of brewed roast coffee. This example demonstrates the ability to beneficially substantially enhance flavor and aroma of a beverage prepared from a fluid instant coffee concentrate by combining with a fluid NAL-milled coffee concentrate to impart fresh groundsy notes not normally provided by instant coffee powders.

Example 11

Low Water Liquid Coffee Concentrate

A non-aqueous fluid coffee concentrate composition (100%/wt) was prepared by combining a solid flavor source (freeze-dried Carte Noire coffee; 33%/wt) with NAL mixture (44%/wt propylene glycol; 17%/wt 1,3-propanediol) and water (6%/wt) in a glass beaker and then high-shear mixing using a rotor-stator mixer (Heidolph Silent Crusher-M at 50,000 rpm) to grind and disperse the coffee into the NAL/water mixture to obtain a smooth dispersion. The resulting fluid coffee concentrate was added to hot (210° F.) tap water in a beaker at a ratio of 3 parts/wt concentrate to 97 parts/wt water and then spoon-stirred to prepare a coffee beverage evaluated to assess flavor and appearance. The beverage had the general appearance of a prepared instant coffee beverage and had a pleasant coffee flavor and aroma. This example demonstrates the ability to use a small amount of water to prepare a shelf-stable fluid coffee concentrate composition.

Example 12

Black Tea Concentrate (and Low-Water Comparison and Prevention of Tannin Precipitation)

Non-aqueous fluid tea concentrate composition "A" (100%/wt) was prepared by combining a solid flavor source (spray-dried instant black tea powder; 25%/wt) with NAL mixture (40%/wt propylene glycol; 35%/wt 1,3-propanediol) in a glass beaker and then heating on a stirplate to 180° F., beneficially above the softening point of the tea powder, to obtain a smooth dispersion of tea in NAL. The resulting fluid tea concentrate was removed from the stirplate, allowed to cool to room temperature, added to hot (210° F.) tap water in a beaker at a ratio of 1 part by weight concentrate to 99 parts by weight water, and then spoon-stirred to prepare a tea beverage evaluated to assess flavor and appearance. The hot beverage had the general appearance of a prepared instant tea beverage and had a pleasant tea flavor and aroma. A second beverage was prepared using the same procedure, except that chilled water (35° F.) was substituted for hot water. The cold beverage had the general appearance of a prepared iced tea beverage and had a pleasant tea flavor and aroma.

Concentrate composition "B" (100%/wt) was prepared by combining the black tea powder (25%/wt) with NAL mixture (40%/wt propylene glycol; 29%/wt 1,3-propanediol) and water (6%/wt) in a glass beaker and then high-shear mixing (same procedure) to grind and disperse the tea into the NAL/water mixture to obtain a smooth dispersion. The resulting fluid tea concentrate was added to hot (210° F.) tap water in a beaker at a ratio of 1 part by weight concentrate to 99 parts by weight water and then spoon-stirred to prepare a tea beverage. The beverage was evaluated for flavor and appearance. The beverage had the general appearance of a prepared instant tea beverage and had a pleasant tea flavor and aroma generally similar to the hot beverage prepared from the concentrate not formulated with water. This example demonstrates the ability to use a small amount of water to prepare a shelf-stable fluid tea concentrate composition.

An aqueous tea concentrate "C" (100%/wt) was prepared by spoon-stirring the black tea powder (25%/wt) into water (75%/wt) in a glass beaker and heating on a stirplate to 180° F. The concentrate was allowed to cool to room temperature over the weekend. A large amount of light colored precipitate (presumed to be tannins) was observed at the bottom of the concentrate "C." By comparison, no precipitate was observed in concentrate composition "A" made with NAL or in concentrate composition "B" made with NAL and only a small quantity of water.

Example 13

Coffee & NAL Flavor Comparisons

A series of non-aqueous fluid coffee concentrate compositions (100%/wt) were prepared using different solid flavor sources (spray-dried Arabica or Robusta instant coffee powders; 33%/wt) in combination with different NALs (propylene glycol, 1,3-propanediol, or glycerol; 67%/wt) to generally compare flavor and viscosity. Reference compositions were prepared using the same coffee powders and proportion of solid to liquid, except water was substituted for NAL.

All concentrate compositions (eight total) were made by separately combining each instant coffee powder (33%/wt) with the NAL or water (67%/wt) in glass beakers, spoon-stirring, and then heating these mixtures to 70° C. (i.e., a temperature above the softening points of the instant coffees (typically 40-80° C., and more typically 50-70° C.)) while spoon stirring to form uniform dispersions of coffee in NAL or uniform solutions of coffee in water. The resulting coffee concentrates were then allowed to cool to room temperature prior to preparation of beverages for evaluation. Eight different beverages were prepared having 1 percent, by weight, coffee solids concentration by separately adding 1 part by weight of each coffee concentrate to beakers, adding 33 parts by weight of hot (210° F.) filtered water to each beaker, and then spoon-stirring to completely disperse each concentrate in water. Alternatively, cold beverages could be prepared using any of these concentrates simply by substituting cold water for hot water, at the same or other ratio of concentrate to water, according to taste.

For Arabica coffee, an untrained panel found all hot beverages prepared from concentrates formulated with NALs had flavor preferred over the reference beverage prepared from concentrate formulated with water. The NAL-containing beverages had lower cereal flavor impact, rounder flavor character, and fuller mouthfeel, with little or no obvious flavor contributed by NAL other than perception of a slight pleasant sweetness as the hot beverages cooled.

For Robusta coffee, the panel found all hot beverages prepared from concentrates formulated with NALs had flavor preferred over the reference beverage prepared from concentrate formulated with water. The NAL-containing beverages had lower earthy flavor impact, rounder flavor character, and fuller mouthfeel, with little or no obvious flavor contributed by NAL other than perception of a slight pleasant sweetness as the hot beverages cooled.

It was surprising that all hot coffee beverages prepared from concentrates formulated with NALs were significantly preferred by the untrained panel over corresponding hot reference beverages prepared from concentrates formulated with water. It was even more surprising that the hot beverage prepared from the concentrate formulated with Robusta coffee and propylene glycol was preferred over the hot reference beverage prepared from the concentrate formulated with Arabica coffee and water, because it is generally accepted that traditionally prepared or brewed Arabica coffee beverages, in general, have flavors that are more preferred over traditionally prepared or brewed Robusta coffee beverages. The noted beverage comprising Robusta coffee and propylene glycol was regarded by the panel as having a more rounded and brewed flavor characteristics and greater overall appeal than the noted beverage comprising Arabica coffee and water.

Another set of hot beverages were similarly prepared from the same coffee concentrates to support further flavor evaluations. In this study, individually prepared beverages were subsequently blended using different combinations of coffee and/or NAL simply by measuring desired volumes of prepared beverages and combining in separate cups for tasting. This method of mixing together already prepared hot beverages provides a more convenient method to assess a wide variety of combinations than preparing concentrates using different combinations and ratios of coffee and NAL. It was surprisingly found by the panel that a liquid-blended hot Robusta beverage comprising equal amounts of propylene glycol and 1,3-propanediol (prepared by liquid blending of hot beverages prepared from concentrates made using only Robusta instant coffee and propylene glycol or 1,3-propanediol) was significantly preferred over a hot reference beverage comprising only Arabica coffee, at the same coffee concentration, and water. In summary, it was found that preparing a generally lower quality Robusta coffee with one or more NAL can beneficially improve perceived flavor quality of prepared beverages to potentially match, or even exceed, the perceived overall flavor quality of higher quality Arabica coffee beverages that are prepared using only water.

Example 14

Prevention of Mannan Crystallization & Precipitation in Coffee Concentrates

A non-aqueous fluid coffee concentrate composition "A" (100%/wt) was prepared by combining a solid flavor source (instant Yuban coffee; 33%/wt) with NAL mixture (67%/wt propylene glycol) in a glass beaker and then heating on a stirplate to 210° F., beneficially above its softening point, to obtain a smooth dispersion of coffee in NAL. The resulting fluid coffee concentrate was removed from the stirplate, allowed to cool to room temperature, and then added to hot (210° F.) tap water in a beaker at a ratio of 2.4 parts by weight concentrate to 97.6 parts by weight water and then spoon-stirred to prepare a coffee beverage that was evaluated to assess flavor and appearance. The hot beverage had the general appearance of a prepared instant coffee beverage and had pleasant flavor and aroma. The concentrate was used to prepare a second beverage using the same procedure, except that chilled water (35° F.) was substituted for hot water and a ratio of 5 parts by weight concentrate to 95 parts by weight water was used. The cold beverage had the general appearance of a prepared iced coffee beverage and had pleasant flavor and aroma. A portion of the concentrate was stored in a capped glass vial at 95° F. for one month.

Aqueous coffee concentrate "B" (100%/wt) was prepared by spoon-stirring the Yuban coffee powder (33%/wt) into water (67%/wt) in a glass beaker and heating on a stirplate to 210° F. The concentrate was allowed to cool to room temperature and was then stored for one month at 95° F. in a capped glass vial. After storage, a large amount of lighter-colored sediment (presumed to be crystalline mannans) was observed at the bottom of the concentrate. Sediment in concentrate "B" occupied nearly 20% of the height of the concentrate in the glass vial. By comparison, no sediment was observed in concentrate "A" made with NAL instead of water and stored for the same time under the same conditions.

Stored concentrates "A" and "B" were then used to prepare hot beverages by adding to hot (210° F.) tap water in a beaker at a ratio of 2.4 parts by weight concentrate to 97.6 parts by weight water and then spoon-stirred to disperse. The hot beverage prepared from concentrate "A" had lighter color, was clear, and was free of cup sediment, while the hot beverage prepared from concentrate "B" had darker color, was cloudy, and contained a substantial amount of visible cup sediment after standing for a few minutes. The insoluble sediment from concentrate "B" did not dissolve in hot water during beverage preparation. Further, it is believed use of water to formulate concentrate "B" caused browning of the coffee component during manufacture and/or storage, as a result of known Maillard reactions, as could be seen from the darkened beverage color, as compared to the color of the beverage prepared from concentrate "A."

Further, the beverage prepared from concentrate "B" had a very sour, undesirable flavor and a measured pH nearly half a pH-unit lower than the beverage prepared from concentrate "A," which had a very clean desirable flavor (not noticeably more sour than before the concentrate was stored), indicating that undesirable hydrolysis of known acid precursors (such as lactones, esters, or melanoidins) occurred during storage of concentrate "B". In summary, use of NAL instead of water to formulate the concentrate greatly improved appearance, flavor, and overall quality of the concentrate and beverage prepared therefrom.

Example 15

Freeze-Concentrated Coffee Extract

A low water fluid coffee concentrate comprising a non-aqueous liquid was prepared by first preparing a water-extracted liquid coffee concentrate, then removing part of the water using freeze-concentration, then combining the resulting concentrate with instant coffee and NAL using the following procedure. A solid flavor source (Yuban Original ground roast coffee; 25%/wt) was combined with hot (210° F.) filtered water (75%/wt) in a beaker. The mixture was left to stand for 10 minutes to extract a portion of water-soluble solids from the coffee into the water before filtering the mixture through a paper filter disc (Whatman 540 8 µm) placed in a Buchner funnel under applied vacuum.

Approximately 35% of the hot water combined with the roast coffee was recovered after filtration to provide a brewed aqueous liquid coffee concentrate having 7%/wt dissolved coffee solids (measured using Omnimark Mark 2 moisture analyzer; program 64 at 120° C.). This concentrate was then poured into a tray, frozen (−80° F.), partially freeze-dried using conventional freeze-drying equipment and methods, then removed from the freeze dryer and allowed to thaw to obtain a more-concentrated liquid coffee concentrate. This concentrate (having 33 percent dissolved coffee solids; 1 part by weight) was then combined with spray-dried instant coffee powder (Yuban; 1 part by weight) and NAL (propylene glycol; 2 parts by weight) in a beaker at room temperature and spoon-stirred to obtain a low-water fluid coffee concentrate composition comprising non-aqueous liquid.

The concentrate was added to hot (210° F.) tap water in a beaker at a ratio of 3 parts by weight to 97 parts by weight water and then spoon-stirred to prepare a coffee beverage that was evaluated to assess flavor and appearance. The beverage had the general appearance of a conventional brewed coffee beverage and had a pleasant coffee flavor and aroma.

A reference beverage was prepared having total coffee solids content and propylene glycol content equal to that of the above-described beverage but was prepared utilizing only the spray-dried instant Yuban coffee powder to provide coffee solids. To accomplish this, freeze-concentrated coffee extract was omitted from a reference coffee concentrate composition and the weight of coffee solids contributed by the freeze-concentrated extract in the above-described composition was replaced using the same weight of spray-dried instant Yuban coffee powder to provide the same total weight of coffee solids in the reference beverage, prepared by adding this reference concentrate to hot water using the same proportions of concentrate and water used to prepare the above-described coffee beverage. Accordingly, the instant Yuban coffee powder contributed 100 percent of the coffee solids in the reference beverage and concentrate, but only 75 percent of the total coffee solids in the above-described coffee concentrate and prepared beverage. The two beverages were directly compared to assess differences in flavor and aroma. The beverage prepared from the concentrate with extract had smoother, more rounded and balanced coffee flavor and fresher aroma than the reference beverage prepared from the reference concentrate and much lower flavor impact typical of spray-dried coffee (cooked, caramel, and bitter). Accordingly, the flavor and aroma prepared from the other concentrate was significantly preferred by an untrained panel and tasted more like brewed coffee than the beverage prepared from the reference concentrate. This example demonstrates the ability to use a brewed coffee concentrate, at least in part, as an alternative to sole use of an instant coffee powder, to prepare a shelf-stable fluid coffee concentrate composition with improved flavor and aroma. It would also be possible to reduce the amount of instant coffee further by increasing the amount of coffee solids from concentrate, such that the amount of instant coffee solids could be reduced to, for example, less than 50 percent, less than 25 percent, or down to 0 percent, of the total solids.

Example 16

Viscosity of Coffee Concentrates

A non-aqueous fluid coffee concentrate composition "A" (100%/wt) was prepared by combining a solid flavor source (instant Maxwell House coffee; 35%/wt) with NAL (65%/wt propylene glycol) in a metal beaker and then heating in a jacketed vessel to 150° F., above its softening point, while high-shear mixing using a rotor-stator mixer (Heidolph Silent Crusher-M at 50,000 rpm) to grind and disperse the coffee into the NAL to obtain a smooth dispersion. The resulting fluid coffee concentrate was poured into a glass jar, then capped, and allowed to cool overnight to room temperature. The next day, the viscosity of the concentrate was measured, using a Brookfield viscometer, and found to be approximately 90,000 cP.

A low water fluid coffee concentrate composition "B" was prepared using the same ingredients, coffee solids level, and methods used to prepare composition "A", except that approximately 15 percent, by weight, of the NAL was replaced with water. Accordingly, concentrate "B" was 35 percent, by weight, coffee, approximately 55 percent, by weight, propylene glycol, and approximately 10 percent, by weight, water. By comparison, similarly jarred and cooled concentrate "B" had a viscosity of only approximately 4,600 cP when measured the next day. This example demonstrates the ability to use a relatively small amount of water in a coffee concentrate to greatly reduce viscosity.

The foregoing descriptions are not intended to represent the only forms of the concentrates in regard to the details of formulation. The percentages provided herein are by weight unless stated otherwise. Changes in form and in proportion of parts, as well as the substitution of equivalents, are contemplated as circumstances may suggest or render expedient. Similarly, while concentrates and methods have been described herein in conjunction with specific embodiments, many alternatives, modifications, and variations will be apparent to those skilled in the art in light of the foregoing description.

What is claimed is:

1. A liquid coffee beverage concentrate comprising:
   about 50 to about 90 percent non-aqueous liquid, the non-aqueous liquid comprising at least one of the group consisting of glycerol, propylene glycol, 1,3-propanediol, polyethylene glycol, polyglycerol, and polyglycerol ester;
   less than about 30 percent water and volatile non-aqueous liquid; and
   about 10 to about 70 percent coffee solids,
   the liquid coffee beverage concentrate being a non-gaseous, flowable, fluid composition at room temperature.

2. The liquid coffee beverage concentrate of claim 1, wherein the non-aqueous liquid comprises non-volatile non-aqueous liquid in amount exceeding or equal to the amount of water and volatile non-aqueous liquid in the concentrate.

3. The liquid coffee beverage concentrate of claim 1, wherein the concentrate comprises about 50 to about 90 percent non-volatile non-aqueous liquid.

4. The liquid coffee beverage concentrate of claim 3, wherein the non-volatile non-aqueous liquid comprises at least one of the group consisting of glycerol, propylene glycol, and 1,3-propanediol.

5. The liquid coffee beverage concentrate of claim 1, wherein the concentrate includes less than about 20 percent by weight volatile non-aqueous liquid and water.

6. The liquid coffee beverage concentrate of claim 5, wherein the amount of water and volatile non-aqueous liquid is less than or equal to the amount of non-volatile non-aqueous liquid.

7. The liquid coffee beverage concentrate of claim 1, wherein the coffee solids are selected from the group consisting of ground coffee beans, freeze-dried coffee, spray-dried coffee, instant coffee powder, ground roast coffee beans, and combinations thereof.

8. The liquid coffee beverage concentrate of claim 7, wherein the coffee solids comprise ground roast coffee beans.

9. The liquid coffee beverage concentrate of claim 1, wherein the non-aqueous liquid comprises non-aqueous liquid sourced from at least one of coffee beans, coffee cherries, spent coffee grounds, and coffee oil.

10. The liquid coffee beverage concentrate of claim 1, wherein the total amount of water and volatile non-aqueous liquid in the concentrate is less than or equal to the total solids content of the concentrate.

11. The liquid coffee beverage concentrate of claim 1, wherein the concentrate comprises about 25 to about 60 percent coffee solids.

12. The liquid coffee beverage concentrate of claim 1, wherein the concentrate includes less than about 20 percent water and volatile non-aqueous liquid.

13. The liquid coffee beverage concentrate of claim 1, wherein the coffee solids are selected from the group consisting of freeze-dried coffee, spray-dried coffee, instant coffee powder, and combinations thereof.

14. A liquid coffee beverage concentrate comprising:
   about 50 to about 90 percent non-aqueous liquid, the non-aqueous liquid comprising at least one of the group consisting of glycerol, propylene glycol, 1,3-propanediol, polyethylene glycol, polyglycerol, and polyglycerol ester;
   less than about 30 percent water and volatile non-aqueous liquid; and
   about 10 to about 70 percent coffee solids, the coffee solids selected from the group consisting of ground coffee beans, freeze-dried coffee, spray-dried coffee, instant coffee powder, ground roast coffee beans, and combinations thereof,
   wherein a total weight of water-soluble solids exceeds a total weight of water-insoluble solids dispersed and/or suspended in the coffee beverage concentrate,
   the liquid coffee beverage concentrate being a non-gaseous, flowable, fluid composition at room temperature.

15. The liquid coffee beverage concentrate of claim 14, wherein the non-aqueous liquid comprises non-volatile non-aqueous liquid in amount exceeding or equal to the amount of water and volatile non-aqueous liquid in the concentrate.

16. The liquid coffee beverage concentrate of claim 14, wherein the concentrate comprises about 50 to about 90 percent non-volatile non-aqueous liquid.

17. The liquid coffee beverage concentrate of claim 14, wherein the non-volatile non-aqueous liquid comprises at least one of the group consisting of glycerol, propylene glycol, and 1,3-propanediol.

18. The liquid coffee beverage concentrate of claim 14, wherein the concentrate includes less than about 20 percent by weight volatile non-aqueous liquid and water.

19. The liquid coffee beverage concentrate of claim 14, wherein the amount of water and volatile non-aqueous liquid is less than or equal to the amount of non-volatile non-aqueous liquid.

20. The liquid coffee beverage concentrate of claim 14, wherein the coffee solids comprise ground roast coffee beans.

21. The liquid coffee beverage concentrate of claim 14, wherein the total amount of water and volatile non-aqueous liquid in the concentrate is less than or equal to the total solids content of the concentrate.

22. The liquid coffee beverage concentrate of claim 14, wherein the concentrate comprises about 25 to about 60 percent coffee solids.

23. The liquid coffee beverage concentrate of claim 14, wherein the concentrate includes less than about 20 percent water and volatile non-aqueous liquid.

24. The liquid coffee beverage concentrate of claim 14, wherein the coffee solids are selected from the group consisting of freeze-dried coffee, spray-dried coffee, instant coffee powder, and combinations thereof.

* * * * *